United States Patent
Jhou et al.

(10) Patent No.: US 11,947,206 B2
(45) Date of Patent: Apr. 2, 2024

(54) ELECTRONIC DEVICE WITH BACKBOARD AND HOUSING

(71) Applicant: InnoLux Corporation, Miao-Li County (TW)

(72) Inventors: Fang-Cheng Jhou, Miao-Li County (TW); Tsu-Hsien Ku, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/174,128

(22) Filed: Feb. 24, 2023

(65) Prior Publication Data

US 2023/0213801 A1 Jul. 6, 2023

Related U.S. Application Data

(63) Continuation of application No. 17/700,023, filed on Mar. 21, 2022, now Pat. No. 11,614,646, which is a continuation of application No. 17/224,397, filed on Apr. 7, 2021, now Pat. No. 11,307,443.

(60) Provisional application No. 63/017,699, filed on Apr. 30, 2020.

(30) Foreign Application Priority Data

Jan. 14, 2021 (CN) .......................... 202110047001.1

(51) Int. Cl.
*G02F 1/1333* (2006.01)
*B32B 1/00* (2006.01)
*B32B 7/14* (2006.01)
*F21V 8/00* (2006.01)

(52) U.S. Cl.
CPC .......... *G02F 1/133314* (2021.01); *B32B 1/00* (2013.01); *B32B 7/14* (2013.01); *G02B 6/0055* (2013.01); *B32B 2457/00* (2013.01); *G02F 2201/50* (2013.01); *G02F 2202/28* (2013.01)

(58) Field of Classification Search
CPC ....... G02F 1/133314; B32B 1/00; B32B 7/14; G02B 6/0055; G02B 6/0088
See application file for complete search history.

(56) References Cited

U.S. PATENT DOCUMENTS

| | | | |
|---|---|---|---|
| 2013/0321740 A1* | 12/2013 | An ....................... | H05K 5/0017 361/679.01 |
| 2016/0018591 A1* | 1/2016 | Lee ....................... | H01L 33/647 362/97.1 |
| 2020/0209457 A1* | 7/2020 | Zhao ................. | G02F 1/133615 |

* cited by examiner

*Primary Examiner* — Tracie Y Green
(74) *Attorney, Agent, or Firm* — McClure, Qualey & Rodack, LLP

(57) ABSTRACT

An electronic device is provided. The electronic device includes a backboard, a circuit board disposed on the backboard, a light source disposed on the circuit board, a housing disposed on the backboard, and a panel disposed on the housing. The panel contacts the housing, and the light source and the circuit board are disposed between the panel and the backboard.

9 Claims, 8 Drawing Sheets

ELECTRONIC DEVICE WITH BACKBOARD AND HOUSING

CROSS REFERENCE TO RELATED APPLICATIONS

This application is a Continuation of U.S. patent application Ser. No. 17/700,023, filed Mar. 21, 2022 and entitled "ELECTRONIC DEVICE HAVING A CURVED SURFACE" know U.S. Pat. No. 11,614,646, issued Mar. 28, 2023), which is a Continuation of U.S. patent application Ser. No. 17/224,397, filed Apr. 7, 2021 and entitled "ELECTRONIC DEVICE HAVING A CURVED SURFACE AND METHOD FOR FABRICATING THE SAME" (now U.S. Pat. No. 11,307,443, issued on Apr. 19, 2022), which claims priority of U.S. Provisional Patent Application No. 63/017,699, filed on Apr. 30, 2020 and China Patent Application No. 202110047001.1 filed on Jan. 14, 2021, the entirety of which are incorporated by reference herein.

BACKGROUND

Field of the Disclosure

The present disclosure relates to an electronic device, and in particular to an electronic device having a curved surface and the method for fabricating the same.

Description of the Related Art

Electronic devices have become indispensable tools in modern life. However, current electronic devices (such as displays) still do not meet expectations for consumers in all respects. For example, in the traditional manufacturing process, when fabricating devices with curved surfaces, panels are bent through a thermal bending process, which is likely to adversely affect the appearance of the panels. Thus, developing a structural design for improving the quality and efficiency of the electronic device is one of the research topics in the current industry.

BRIEF SUMMARY

An electronic device is provided by some embodiments of the disclosure. The electronic device includes a backboard, a circuit board disposed on the backboard, a light source disposed on the circuit board, a housing disposed on the backboard, and a panel disposed on the housing. The panel contacts the housing, and the light source and the circuit board are disposed between the panel and the backboard.

A detailed description is given in the following embodiments with reference to the accompanying drawings.

DETAILED DESCRIPTION

Figure 1:
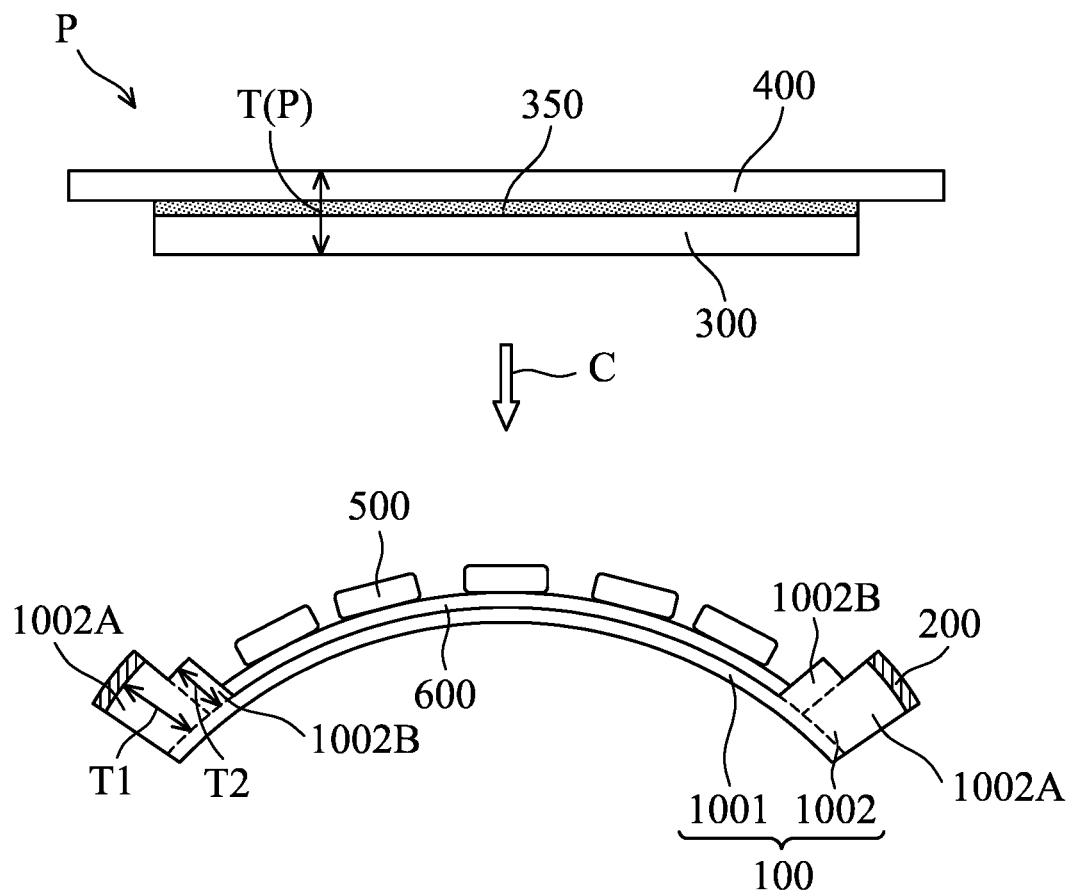
FIG. 1 is a cross-sectional view illustrating a process for forming an electronic device having a curved surface in accordance with some embodiments of the present disclosure.

The electronic device and the method for fabricating the same in the embodiments of the present disclosure will be described in detail in the following context. It is noted that many different embodiments provided in the following description are used to implement different aspects of the embodiments. The specific elements and configurations described in the following detailed description are set forth in order to clearly describe some embodiments of the present disclosure. It will be apparent that the exemplary embodiments set forth herein are used merely for the purpose of illustration, and are not used to limit the scope of the present disclosure. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

The present disclosure can be understood by referring to the following detailed description in conjunction with the accompanying drawings. It should be noted that in order to facilitate the reader's understanding and the simplicity of the figures, the multiple drawings in this disclosure only depict a part of the electronic device, and the specific elements in the figures are not drawn according to actual scale. In addition, the number and size of each element in the figure are only for illustration, and are not used to limit the scope of the disclosure. In addition, the number and the size of each element in the figures are only for illustration, and are not used to limit the scope of the disclosure.

It should be appreciated that the elements or devices in the figures of the present disclosure may be present in any form or configuration known to those with ordinary skill in the art. In addition, in the embodiments, relative expressions are used. For example, "lower", "bottom", "higher" or "top" are used to describe the position of one element relative to another. It should be appreciated that if a device is flipped upside down, an element that is "lower" will become an element that is "higher". The descriptions of the exemplary embodiments are intended to be read in connection with the accompanying drawings, which are to be considered part of the entire written description.

In addition, the following expression "the first element is disposed on the second element" includes the conditions where the first element and the second element are in direct contact, or one or more other elements are disposed between the first element and the second element so that they are not in direct contact.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ". Thus, when the terms "include", "comprise" and/or "have" are used in the description of the present disclosure, the corresponding features, areas, steps, operations and/or components would be pointed to existence, but not limited to the existence of one or a plurality of the corresponding features, areas, steps, operations and/or components.

In addition, the relative expressions mentioned in the context, such as "upper", "lower", "bottom", "from", "back", "left" or "right", are used to describe the direction referring to figures. Therefore, the directional terms used are for illustration, and are not used to limit the scope of the disclosure. In the figures, each figures presents the general features of the methods, structures, and/or materials used in specific embodiments. However, these figures should not be construed as defining or limiting the scope or characteristics covered by these embodiments. For example, for the sake of clarity, the relative size, thickness, and position of each layer, region, and/or structure may be shrink or enlarged.

When a corresponding component (such as a film layer or a region) is referred to as "on another component", it can be directly disposed on another component, or other components are disposed between the two. On the other hand, when a component is referred to as "directly on another component", no component is disposed between the two. In addition, when a component is referred to as "on another member", the two have a vertical relationship in the top view direction. Thus, the component may be on or under the other one, and the up-down relationship depend on the orientation of the device.

In addition, it should be understood that, although the terms "first", "second", "third" or the like may be used herein to describe various elements, components, or portions, these elements, components, or portions should not be limited by these terms. These terms are only used to distinguish one element, component, or portion from another element, component, or portion. Thus, a first element, component, or portion discussed below could be termed a second element, component, or portion without departing from the teachings of the present disclosure.

The terms "about", "substantially", "equal", or "same" generally mean within 10% of a given value or range, or mean within 5%, 3%, 2%, 1%, or 0.5% of a given value or range. The given value here is an approximate value. That is, "about", "substantially" may be still implied without a specific description of "about", "substantially". In addition, the phrase "in a range from a first value to a second value" indicates the range includes the first value, the second value, and other values in between.

It should be appreciated that, in the embodiments described in the following, the several features in different embodiments may be replaced, reorganized, and mixed to complete other embodiments without departing from the spirit of the present disclosure. The features of the various embodiments can be used in any combination as long as they do not depart from the spirit and scope of the present disclosure.

In the present disclosure, the thickness, length, and width can be measured by using an optical microscope, and the thickness can be measured by the cross-sectional image in the electron microscope, but it is not limited thereto. In addition, a certain error may be present in a comparison with any two values or directions. If the first value is equal to the second value, it implies that an error of about 10% between the first value and the second value may be present. If the first direction is perpendicular to the second direction, the angle between the first direction and the second direction may be between 80 degrees and 100 degrees. If the first direction is parallel to the second direction, the angle between the first direction and the second direction may be between 0 degrees and 10 degrees.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure.

In the present disclosure, when referring to an element presenting a flat surface or an element having a flat surface, the radius of curvature of the element may be greater than or equal to 3000 mm (≥3000 mm). On the contrary, when referring to an element presenting a curved surface or an element having a curved surface, the radius of curvature of the element may be less than 3000 mm (<3000 mm).

Referring to FIG. 1, FIG. 1 is a cross-sectional view illustrating a process for forming an electronic device having a curved surface in accordance with some embodiments of the present disclosure. As shown in upper portion of FIG. 1, a composite panel P is formed by adhering a panel 300 to a protective substrate 400 using an optical adhesive 350 (such as optical clear adhesive, OCA), but the present disclosure is not limited thereto. The composite panel P may further include other elements depending on the requirements.

In the embodiments of the present disclosure, the panel 300 and the protective substrate 400 may substantially present flat surfaces. Also, the composite panel P, which is formed by adhering the panel 300 to the protective substrate 400 through the optical adhesive 350, may also present a flat surface. In some embodiments, the thickness T of the composite panel P may be about 1.3 mm-3.5 mm, such as about 1.5 mm-3.2 mm, or about 1.8 mm-2.9 mm, but it is not limited thereto. The thickness T of the composite panel P may be adjusted depending on the requirements. The thickness T of the composite panel P may be, for example, the maximum thickness of the composite panel P.

In some embodiments, the protective substrate 400 may include a flexible substrate, a rigid substrate, or a combination thereof. According to some embodiments, the materials of the protective substrate 400 may include glass, quartz, sapphire, ceramics, polyimide (PI), polycarbonate (PC), polyethylene terephthalate (PET), polypropylene (PP), another suitable material, or a combination thereof, but the present disclosure is not limited thereto. In some embodiments, the materials of the protective substrate 400 may include soda-lime glass, Al—Si glass, anti-glare glass (AG glass), or another suitable glass, but the present disclosure is not limited thereto. In some embodiments, the thickness of the protective substrate 400 may be about 0.5-1.7 mm, such as about 0.6-1.6 mm or about 0.7-1.48 mm, but it is not limited thereto. The thickness of the protective substrate 400 may be, for example, the maximum thickness of the protective substrate 400.

In some embodiments, the protective substrate 400 may be formed by grinding, chemical strengthen, decoration, and/or surface treatment, and other suitable steps, but the present disclosure is not limited thereto. In other embodiments, the protective substrate 400 may add other steps or omit any one of the above steps depending on requirements.

In some embodiments, chemical strengthen may include ion strengthened, such as strengthened by adding potassium ions ($K^+$) or other ions, but the present disclosure is not limited thereto. In other embodiments, the protective substrate 400 may be strengthened using other methods. In some embodiments, decoration may include disposing a shielding layer (such as a black matrix) or another film on the protective substrate 400, but the present disclosure is not limited thereto. In some embodiments, surface treatment may include disposing an anti-reflective film, an anti-smudge film or another surface film treatment, but it is not limited thereto.

In some embodiments, the panel 300 may be a display panel, a touch panel, a sensor panel, an antenna panel, or another suitable panel. In some embodiments (not shown), the panel 300 may include a substrate, a polarizer, an electrode, a liquid crystal layer, an alignment layer, a driving circuit layer, a color filter layer, a shielding layer and/or spacer layer, but the present disclosure is not limited thereto. In some embodiments, a substrate of the display panel may include glass, quartz, sapphire, ceramic, polyimide (PI), polycarbonate (PC), photosensitive polyimide (PSPI), polyethylene terephthalate (PET), another suitable material, or a combination thereof, but the present disclosure is not limited thereto.

In some embodiments, the thickness of the panel 300 may be about 0.8-1.6 mm, such as about 1.0-1.5 mm or about 1.1-1.3 mm, but it is not limited thereto. The thickness of the panel 300 may be, for example, the maximum thickness of the panel 300.

In some embodiments, the optical adhesive 350 may include an optical clear adhesive (OCA), a liquid optical clear adhesive (LOCA), an optical clear resin (OCR), another suitable material, or a combination thereof, but the present disclosure is not limited thereto.

In some embodiments, the optical adhesive 350 may first selectively adhere to either of the panel 300 or the protective substrate 400, and then adhere to the other. Thus, the panel 300 and the protective substrate 400 are adhered by the optical adhesive 350 to form the composite panel P.

As shown in a lower portion of FIG. 1, a back frame 100 having a curved surface is provided for assembling with or adhering to the composite panel P. In some embodiments, the radius of curvature of the back frame 100 having a curved surface may be, for example, less than 3000 mm (<3000 mm). In some embodiments, the back frame 100 having the curved surface may include a backboard 1001 and a housing 1002, but the present disclosure is not limited thereto. In some embodiments, the housing 1002 may be, for example, connected to or disposed on a portion of the backboard 1001. In some embodiments, the housing 1002 is, for example, disposed correspondingly on at least portions of the edges of the backboard 1001. In some embodiments, the backboard 1001 and the housing 1002 may include the same material or different materials. In some embodiments, the backboard 1001 and the housing 1002 are integrally formed. In some embodiments, the housing 1002 may be, for example, a portion of protrusion, which extends toward the composite panel P and supports for the composite panel P, of the back frame 100 having the curved surface. In some embodiments, the backboard 1001 and the housing 1002 may be formed by bonding or welding other materials, and may have the same material or different materials. In some embodiments, backboard 1001 and the housing 1002 may be assembled using other methods.

In some embodiments, the housing 1002 may have different thickness, such as having a stepped shape or another shape in a cross-sectional view, but the present disclosure is not limited thereto. In some embodiments, the housing 1002 may include a first portion 1002A and a second portion 1002B. For example, the thickness T1 of the first portion 1002A may be greater than the thickness T2 of the second portion 1002B, but the present disclosure is not limited thereto. The thickness T1 of the first portion 1002A are defined as, for example, the maximum thickness of the first portion. The thickness T2 of the second portion 1002B are defined as, for example, the maximum thickness of the second portion. In other embodiments (not shown), the thickness T1 of the first portion 1002A may be, for example, equal to the thickness T2 of the second portion 1002B. In some embodiments, the first portion 1002A and the second portion 1002B have the same material, but the present disclosure is not limited thereto. In some embodiments, the second portion 1002B may be, for example, closer to a circuit board 600 than the first portion 1002A. In some embodiments, the panel 300 of the composite panel P may, for example, be disposed correspondingly on the second portion 1002B and selectively contact the second portion 1002B. In some embodiments, the patterned adhesive element 200 may, for example, be disposed on the first portion 1002A and selectively contact the first portion 1002A. In other words, the patterned adhesive element 200 may be disposed, for example, on a portion of the housing 1002 (or the back frame 100). In some embodiments, the patterned adhesive element 200 and the panel 300 may not, for example, overlap each other, or may not adhere to each other.

In some embodiments, the backboard 1001 and the housing 1002 of the back frame 100 having the curved surface may include metal materials, such as copper (Cu), silver (Ag), gold (Au), tin (Sn), aluminum (Al), molybdenum (Mo), tungsten (W), chromium (Cr), nickel (Ni), platinum (Pt), titanium (Ti), alloys of the above metals, another suitable material, or a combination thereof, but the present disclosure is not limited thereto. In some embodiments, the back frame 100 having the curved surface may be formed by a lathe or using another method, but the present disclosure is not limited thereto. As shown in FIG. 1, the patterned adhesive element 200 is disposed on a portion of the back frame 100 having the curved surface. For example, the patterned adhesive element 200 is disposed on the first portion 1002A of the housing 1002. Also, the patterned adhesive element 200 may overlap at least a portion of the first portion 1002A of the housing 1002, and selectively contact the first portion 1002A, but the present disclosure is not limited thereto. In some embodiments, the patterned adhesive element 200 is not disposed on a portion of the backboard 1001 and/or the second portion 1002B of the housing 1002. In some embodiments, the patterned adhesive element 200 does not overlap a portion of the backboard 1001 and/or the second portion 1002B of the housing 1002, but the present disclosure is not limited thereto. In some embodiments, the electronic device having curved surface include a backlight source 500 and a circuit board 600 for driving the backlight source 500, for example, disposed on the back frame 100 having the curved surface. In some embodiments, the circuit board 600 and/or the backlight source 500 are, for example, disposed on the backboard 1001 but not overlapped with the housing 1002. In some embodiments, the patterned adhesive element 200 is not be overlapped with the circuit board 600 and/or the backlight source 500. In some embodiments, the patterned adhesive element 200 is disposed on a portion of the housing 1002 (such as the first portion 1002A) without extending over the second portion 1002B or the backlight source 500, thereby reducing the light emitted from the backlight source 500 being adsorbed by the patterned adhesive element 200, which would otherwise affect adversely the display performance.

In some embodiments, the patterned adhesive element 200 further includes materials having light-shielding property to reduce side light leakage. In some embodiments, the patterned adhesive element 200 may include a double-sided tape, a light curing adhesive, a light blocking adhesive, another suitable material, or a combination thereof, but the present disclosure is not limited thereto. In some embodiments, the thickness of the patterned adhesive element 200 may be about 0.01 mm-0.8 mm, such as about 0.02 mm-0.7 mm or about 0.05 mm-0.6 mm, but it is not limited thereto. In some embodiments, the backlight source 500 may include, for example, a direct backlight or an edge backlight. For example, the backlight source 500 in FIG. 1 is shown as the direct backlight, while the backlight source 500 in FIG. 7 in the following may be referred to as the edge back light.

In some embodiments, the backlight source 500 may include a light emitting diode (LED), cold cathode fluorescent lamp (CCFL), but the present disclosure is not limited thereto. The light emitting diode (LED) may include a mini LED, a micro LED, quantum dot (QD) light-emitting diode (such as including QLED, QDLED), fluorescence, phosphor, or another suitable material, and the materials may be arbitrarily arranged and combined, but the present disclosure is not limited thereto. In some embodiments, an optical element (not shown) may be selectively disposed between the backlight source 500 and the panel 300, such as a diffuser plate, a brightness enhancement film (BEF), or another suitable optical element.

Figure 2:
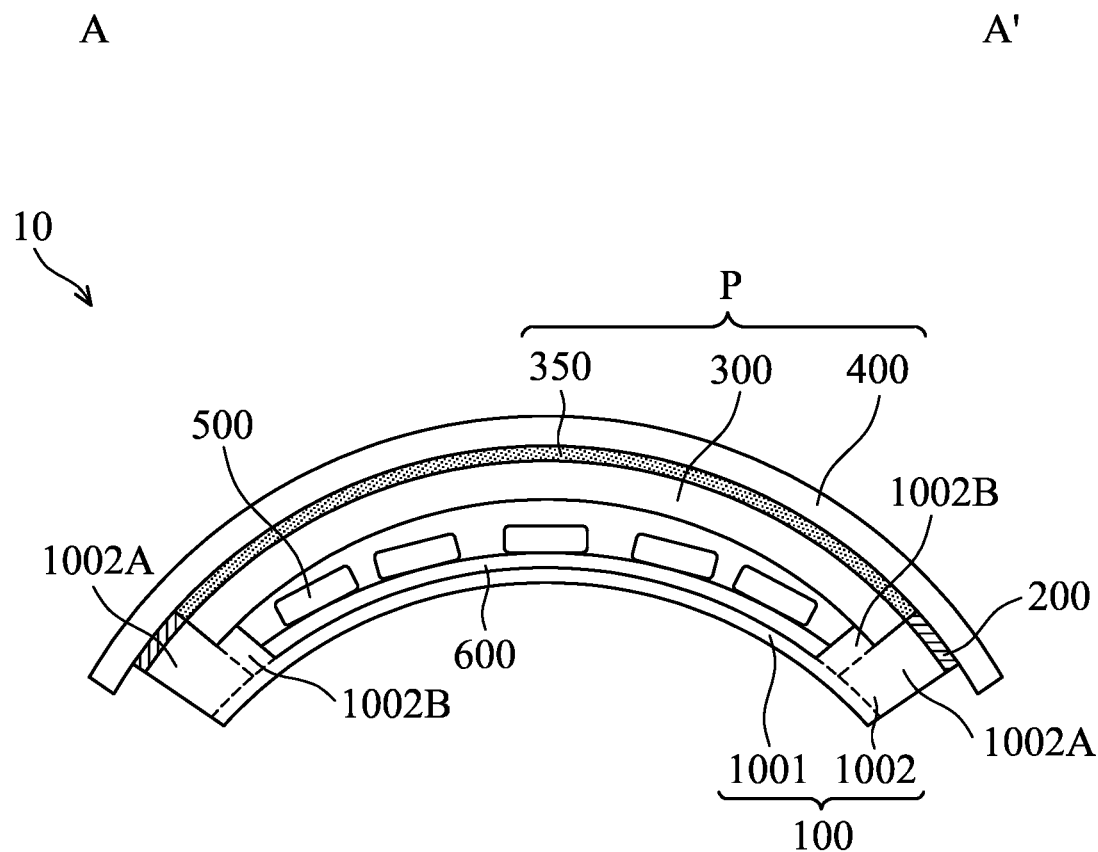
FIG. 2 is a cross-sectional view illustrating an electronic device having a curved surface in accordance with some embodiments of the present disclosure.
Figure 3:
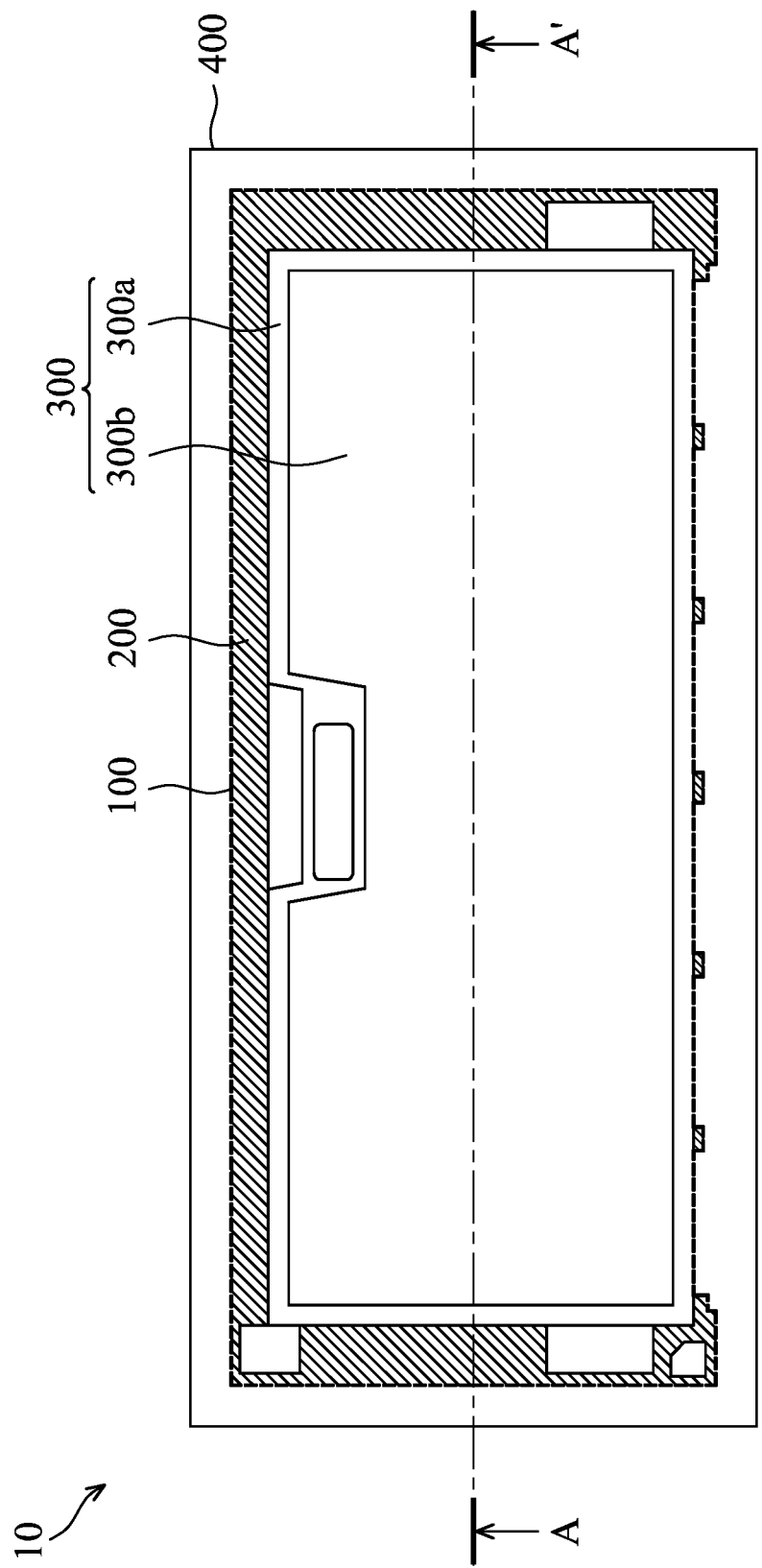
FIG. 3 is a top view illustrating the electronic device having the curved surface corresponding to FIG. 2 in accordance with some embodiments of the present disclosure.

As shown in FIG. 1, in a cold bending process C, the composite panel P (flat surface) and the back frame 100 having curved surface adhere to each other via the patterned adhesive element 200 to form an electronic device 10 having a curved surface as shown in FIG. 2 and FIG. 3. Specifically, the composite panel P, which includes the protective substrate 400, the optical adhesive 350, and the panel 300, substantially presents a flat surface (that is, the radius of curvature is substantially greater than or equal to 3000 mm (≥3000 mm)). Referring to FIG. 2, after the cold bending process C, the composite panel P (which includes the protective substrate 400 having the curved surface, the panel 300 having the curved surface, and the optical adhesive 350 between them that adheres them together) substantially presents a curved surface (that is, the radius of curvature is less than about 3000 mm (<3000 mm)).

In some embodiments, after the cold bending process C, the radius of curvature of the composite panel P is substantially greater than 1000 mm and equal to or less than 3000 mm (1000 mm≤the radius of curvature of the composite panel P<3000 mm), such as 1200 mm, 1500 mm, 1700 mm, 1900 mm, 2200 mm, but the present disclosure is not limited thereto. In some other embodiments, the radius of curvature of the composite panel P is equal to or greater than 1500 mm and equal to or less than 2500 mm (1500 mm≤the radius of curvature of the composite panel P≤2500 mm). When the radius of curvature of the composite panel P is less than 1000 mm, the composite panel P is likely to be damaged due to small curvature, but the present disclosure is not limited thereto.

Generally, the thermal bending process is defined as elements being bent at a temperature greater than the softening temperature (such as 500-600° C.) of the substrate (such as glass). In contrast, the cold bending process is defined as the element being bent at a temperature less than the softening temperature of the substrate, such as at an ambient temperature. In some embodiment, the cold bending process is performed at a temperature between about 10° C. and about 60° C. (10° C. the temperature 60° C.), or at a temperature between about 12° C. and about 50° C. (12° C. the temperature 50° C.), or at a temperature between about 15° C. and about 40° C. (15° C. the temperature 40° C.), but the present disclosure is not limited thereto.

In some embodiments, after the cold bending process C, the radius of curvature of the composite panel P may be substantially equal to the radius of curvature of the back frame 100 having the curved surface, but the present disclosure is not limited thereto. In some embodiments, after the cold bending process C, the shape of the curved surface of the composite panel P may be changed substantially following the structural shape of the curved surface of the back frame 100 having the curved surface, but the present disclosure is not limited thereto.

In some embodiments, the cold bending process includes manually or mechanically pressing the composite panel P (presenting a flat surface) onto the back frame 100 having the curved surface, and adhering the composite panel P to the back frame 100 having the curved surface via the patterned adhesive element 200. At this time, the composite panel P presents the curved surface. Compared with the thermal bending process, using the cold bending process to bond the composite panel P not only obviates the need for high-cost thermal bending equipment, but also reduces defects (such as water ripples or pitting or the like) caused by the thermal bending process to bend the composite panel P (including the panel 300 and the protective substrate 400). Furthermore, compared with assembling the composite panel having the curved surface with the back frame having the curved surface, assembling the composite panel having the flat surface with the back frame having the curved surface provided by the present disclosure may avoid the curvature of radius differences between the composite panel P having the curved surface and the back frame 100 having the curved surface to impact the adhesion yield when the composite panel P having the curved surface adheres to (assembled with) the back frame 100 having the curved surface.

In some embodiments, when the composite panel P having the curved surface is required to peel off from the back frame 100 having the curved surface subsequently, the composite panel P having the curved surface may, for example, substantially return to the original flat surface, assuming that the cold bending process C provided by the present disclosure is used to adhere (assembly) the composite panel P to the back frame 100 having the curved surface. In some embodiments, when the back frame 100 having the curved surface is damaged, the composite panel P having the curved surface adhered thereto may be peel from it, and then the composite panel P may substantially return to the flat surface. Subsequently, it may be adhered to another undamaged back frame having a curved surface by the cold bending process C, thereby improving the flexibility of fabricating the electronic device having the curved surface.

FIG. 2 is a cross-sectional view illustrating an electronic device 10 having a curved surface in accordance with some embodiments of the present disclosure. FIG. 3 is a top view illustrating the electronic device 10 having the curved surface corresponding to FIG. 2 in accordance with some embodiments of the present disclosure. Specifically, the cross-section line A-A' of FIG. 3 may correspond to the cross-sectional view of FIG. 2.

In accordance with some embodiments, the electronic device 10 may include a display device, a light emitting device, a touch device, a sensing device, a splice device, other suitable devices or a combination thereof, but the present disclosure is not limited thereto. The electronic device may be a bendable, foldable or flexible electronic device. The electronic device may include, for example, a liquid crystal device, and may include a backlight module, but the present disclosure is not limited thereto. The display device is used as an exemplary electronic device in the following context, but the present disclosure is not limited thereto.

It should be appreciated that in order to clearly describe the present disclosure, portions of elements of the electronic device 10 are omitted in the Figures, and thus only some of the elements are illustratively shown in Figures. In accordance with some embodiments, additional features may be added in the electronic device 10 described below. In other embodiments, a portion of the elements or layers may be replaced or omitted depending on requirements.

Referring to FIG. 2 and FIG. 3, the electronic device 10 having the curved surface includes the back frame 100 having the curved surface, the patterned adhesive element 200, the panel 300 having the curved surface, the optical adhesive 350, the protective substrate 400 having the curved surface, the backlight source 500 and/or the circuit board 600, and the materials, the structural shape and/or the forming method of them are mentioned above, and are not repeated here. In some embodiments, the panel 300 having the curved surface is, for example, disposed on the back frame 100 having the curved surface. In some embodiments, the protective substrate 400 having the curved surface is, for example, disposed on the panel 300 having the curved surface. In some embodiments, the patterned adhesive element 200 is, for example, disposed on a portion of the back frame 100 having the curved surface (such as the first portion 1002A of the housing 1002). In some embodiments, the back frame 100 having the curved surface and the protective substrate 400 having the curved surface adhere to each other via the patterned adhesive element 200. In some embodiments, the patterned adhesive element 200 and the panel 300 having the curved surface may not overlap each other, but the present disclosure is not limited thereto. In some embodiments, the patterned adhesive element 200 is disposed on the first portion 1002A of the housing 1002 of the back frame 100 having the curved surface, while the panel 300 having the curved surface is disposed on the second portion 1002B of the housing 1002. In other words, the patterned adhesive element 200 and the panel 300 having the curved surface do not adhere to each other. In some embodiments, the panel 300 having the curved surface adheres to the protective substrate 400 having the curved surface by the optical adhesive 350. In some embodiments, the electronic device 10 includes the backlight source 500 disposed between the back frame 100 having the curved surface and the panel 300 having the curved surface without being overlapped with the patterned adhesive element 200.

The patterned adhesive element 200 disposed on the housing 1002 of the back frame 100 having the curved surface may reduce the chance of the light emitted from the backlight source 500 being partially adsorbed by the patterned adhesive element 200, thereby reducing the amount of the light entering the panel 300 and thus impacting the display quality.

In the embodiment of FIG. 2, from the perspective of users, the electronic device 10 having the curved surface presents, for example, a convex surface, which means the middle of the electronic device is protrude from the periphery of the device, but the present disclosure is not limited thereto. In other embodiments, form the perspective of users, the electronic device 10 having the curved surface presents a concave surface, which means the middle of the electronic device is recessed from the periphery of the device, but the present disclosure is not limited thereto. In some other embodiments, the electronic device 10 having the curved surface presents a wavy surface, another surface shape, or the like. The electronic device in the embodiment of FIG. 2 may be also referred to as the direct backlight, and the backlight source thereof may be arranged on the backboard 1001, for example, in an array or in some other manner, but the present disclosure is not limited thereto.

In the embodiment of FIG. 3, the panel 300 having the curved surface includes a display region 300b and a peripheral region 300a adjacent to or surrounding the display region 300b. In some embodiments, from a top view of the electronic device 10, the display region 300b may be designed with different shape depending on requirements, such as rectangular, polygonal, arc, or another suitable shape. In some embodiments, from a top view of the electronic device 10, the peripheral region 300a may be designed with different shape depending on requirements, such as rectangular, polygonal, arc, or another suitable shape. In some embodiments, from a top view of the electronic device 10, the shape of the display region 300b and the shape of the peripheral region 300a may be the same or different.

In the embodiment of FIG. 2 and FIG. 3, from a top view of the electronic device 10, the area of the protective substrate 400 having the curved surface may be greater than that of the back frame 100 having the curved surface (as shown in heavy dashed line), and the area of the back frame 100 having the curved surface may be greater than that of the panel 300 having the curved surface, but the present disclosure is not limited thereto. In some embodiments, from a top view of the electronic device 10, the shape of the panel 300 having the curved surface, that of the back frame 100 having the curved surface, and/or that of the protective substrate 400 may be adjusted depending on requirements. The patterned adhesive element 200 may be, for example disposed adjacent to at least an edge of the panel 300 having the curved surface, or may be disposed on at least an edge of the housing 1002 of the back frame 100 having the curved surface. For example, the patterned adhesive element 200 may be disposed, for example, adjacent to three edges of the panel 300 having the curved surface, but the present disclosure is not limited thereto. In other embodiments (not shown), the patterned adhesive element 200 may be divided into a plurality of sub parts (not shown) separating from each other according to requirements, and the size or the extending direction of which may be adjusted according to requirements. In other embodiments (not shown), the patterned adhesive element 200 may be divided into a plurality of sub parts (not shown) separating from each other according to requirements, and the materials of which may be the same or different.

In the embodiment of FIG. 2 and FIG. 3, the protective substrate 400 having the curved surface may be corresponding to the panel 300 having the curved surface, but the present disclosure is not limited thereto. In other embodiment, the protective substrate 400 having the curved surface may be corresponding to a plurality of the panel 300 having the curved surface, which may form a splice device or a device for another application. The different panels 300 each having the curved surface, as mentioned above, may be, for example, used to display different images, which will be described later in FIG. 10 and FIG. 11.

In some embodiments, the electronic device 10 may be applied to a display device for a vehicle, such as an instrument cluster, a head-up display (HUD), a center information display (CID), a rear seat entertainment (RSE), or displays for other applications, or the like, but the present disclosure is not limited thereto.

Next, referring to FIGS. 4-9, FIGS. 4-9 are cross-sectional views, which respectively illustrate electronic devices 20, 30, 40, 50, 60 and 70 having curved surfaces, in accordance with some other embodiments of the present disclosure. It should be appreciated that the same or similar components or elements in the following context will be denoted by the same or similar reference numerals, and the materials, the fabricating methods and the functions of which are the same as or similar to the above, and thus they will not be repeated later.

Figure 4:
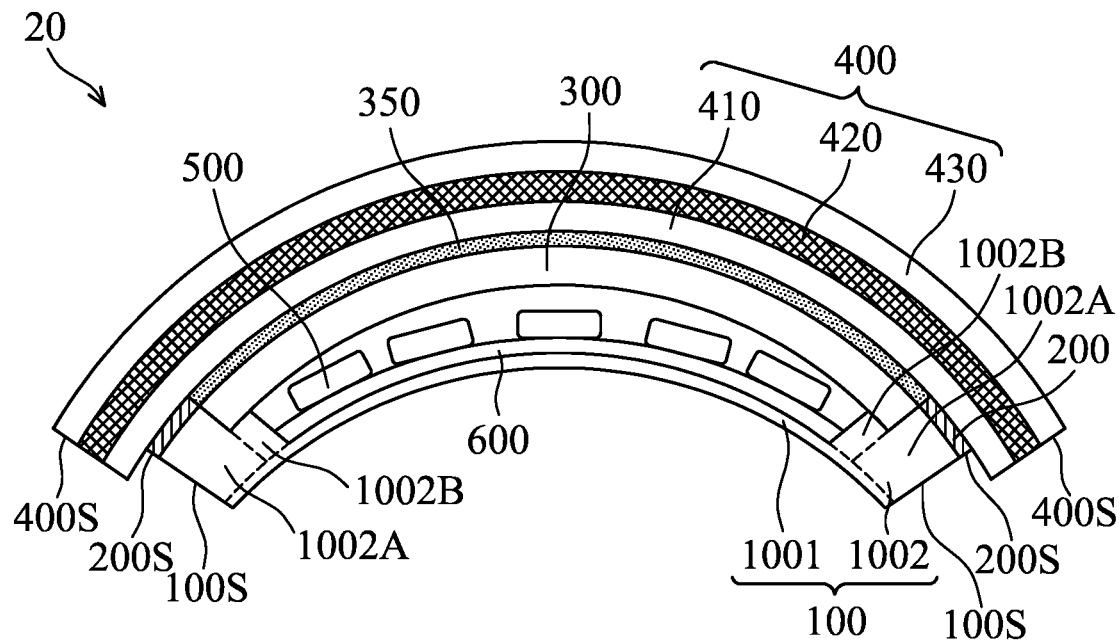
FIGS. 4-9 are cross-sectional views illustrating electronic devices having curved surfaces in accordance with some other embodiments of the present disclosure.

The electronic device 20 shown in FIG. 4 is similar to the electronic device 10 shown in FIG. 2. The difference between the electronic device 20 and the electronic device 10 is that the protective substrate 400 having the curved surface has a plurality of substrates (such as the substrate 410 and the substrate 430), any two adjacent of which are adhere to each other via an adhesive layer 420, but the present disclosure is not limited thereto. The mentioned protective substrate 410 may have better strength. In some embodiments, the substrate 410 and the substrate 430 may have the same or different materials, which may be similar to the materials of the protective substrate 400 described above, and thus is not repeated here for brevity. In some embodiments, the adhesive layer 420 may include a thermosetting adhesive layer and a light curing adhesive layer, but the present disclosure is not limited thereto. In some embodiments, the adhesive layer 420 may include polyvinyl butyral (PVB), ethylene-vinyl acetate (EVA), thermoplastic polyurethane (TPU), optical adhesive (OCA), other suitable materials or a combination thereof, but the present disclosure is not limited thereto. In some embodiments, the radius of curvature of the substrate 410 and the radius of curvature of the substrate 430 are substantially the same. In some embodiments, in a cross sectional direction of the electronic device 20, the protective substrate 400 having the curved surface may protrude from the back frame 100 having the curved surface. Specifically, the side surface 400S of the protective substrate 400 having the curved surface of the electronic device 20 may protrude from the side surface 200S of the patterned adhesive element 200 and/or the side surface 100S of the back frame 100 having the curved surface, but the present disclosure is not limited thereto. In the embodiment where the protective substrate 400 has a plurality of substrates (such as the substrate 410 and the substrate 430), the protective substrate 400 may be formed by first cutting, decorating, and/or surface treating the substrates (such as the substrate 410 and the substrate 430), and then adhering the substrates (such as the substrate 410 and the substrate 430) to each other by the adhesive layer 420, followed by grinding, but the present disclosure is not limited thereto.

Figure 5:
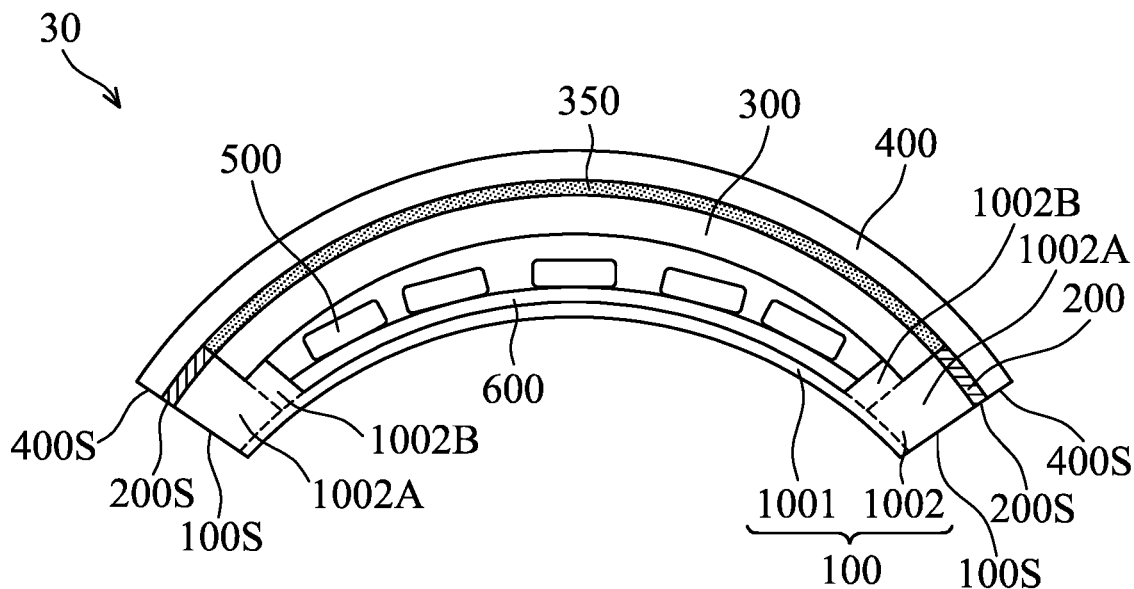

The electronic device 30 shown in FIG. 5 is similar to the electronic device 10 shown in FIG. 2. The difference between the electronic device 30 and the electronic device 10 is that in the cross-sectional direction of the electronic device 30, the protective substrate 400 having the curved surface may be, for example, substantially aligned with the back frame 100 having the curved surface. Specifically, in the cross-sectional direction of the electronic device 30, at least a side surface 400S of the protective substrate 400 having the curved surface, at least a side surface 200S of the patterned adhesive element 200 having the curved surface, and at least a side surface 100S of the back frame 100 having the curved surface are substantially aligned, but the present disclosure is not limited thereto.

Figure 6:
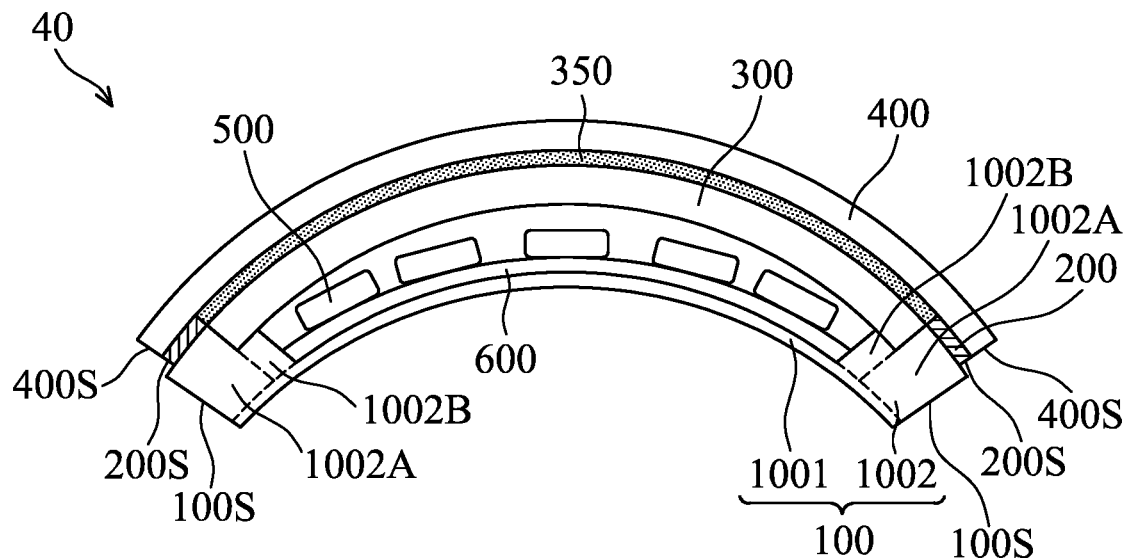

The electronic device 40 shown in FIG. 6 is similar to the electronic device 10 shown in FIG. 2. The difference between the electronic device 40 and the electronic device 10 is that in the cross-sectional direction of the electronic device 40, the protective substrate 400 may be recessed from the edge of the back frame 100 having the curved surface, for example. Specifically, in the cross-sectional direction of the electronic device 40, the side surface 400S of the protective substrate 400 having the curved surface may be, for example, recessed from the side surface 100S of the back frame 100 having the curved surface to reduce the occurrence of the fragments caused by impacted by other elements, but the present disclosure is not limited thereto. In some embodiments, the side surface 100S of the back frame 100 having the curved surface may exceed the side surface 400S of the protective substrate 400 having the curved surface by about 10 mm or less, but the present disclosure is not limited thereto.

Figure 7:
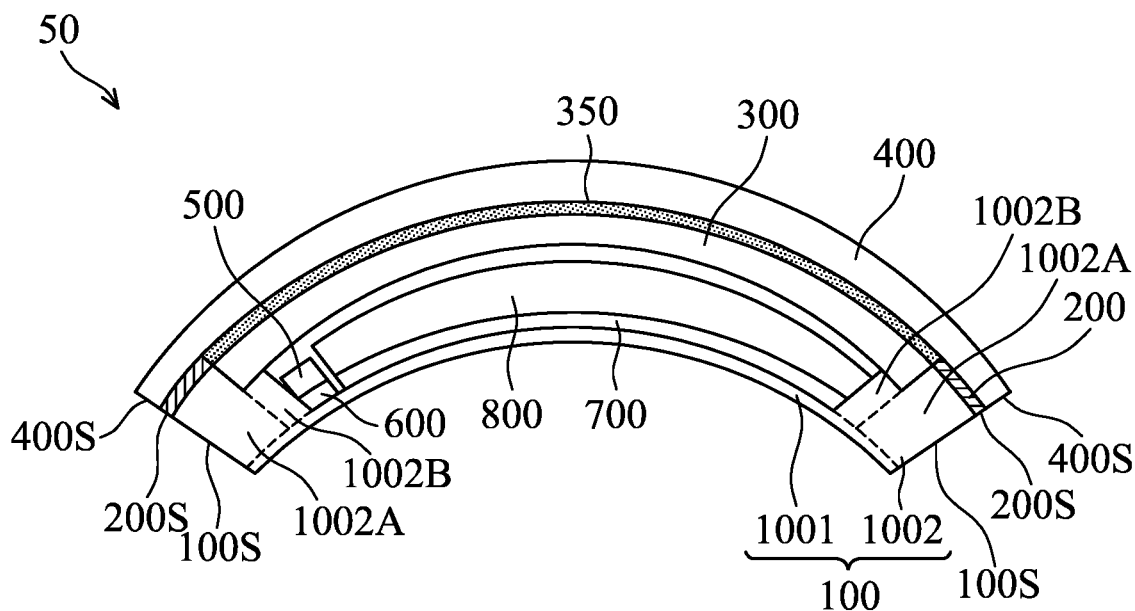

The electronic device 50 shown in FIG. 7 is similar to the electronic device 30 shown in FIG. 5. The difference between the electronic device 50 and the electronic device 30 is that the direct backlight is replaced by the edge backlight. Specifically, the backlight source 500 and the circuit board 600 are disposed, for example, adjacent to at least a side of the light guide plate 800 and/or the reflector 700, which is disposed on the backboard 1001 of the back frame 100 having the curved surface, for example, but the present disclosure is not limited thereto. The curved-shape of the electronic device provided by the present disclosure may be changed depending on the real product design, such as the shape of the convex surface where the middle of the device protrudes from the periphery, that of the concave surface where the middle of the device recesses from the periphery, that of the wavy surface or another shape, but the present disclosure is not limited thereto.

Figure 8:
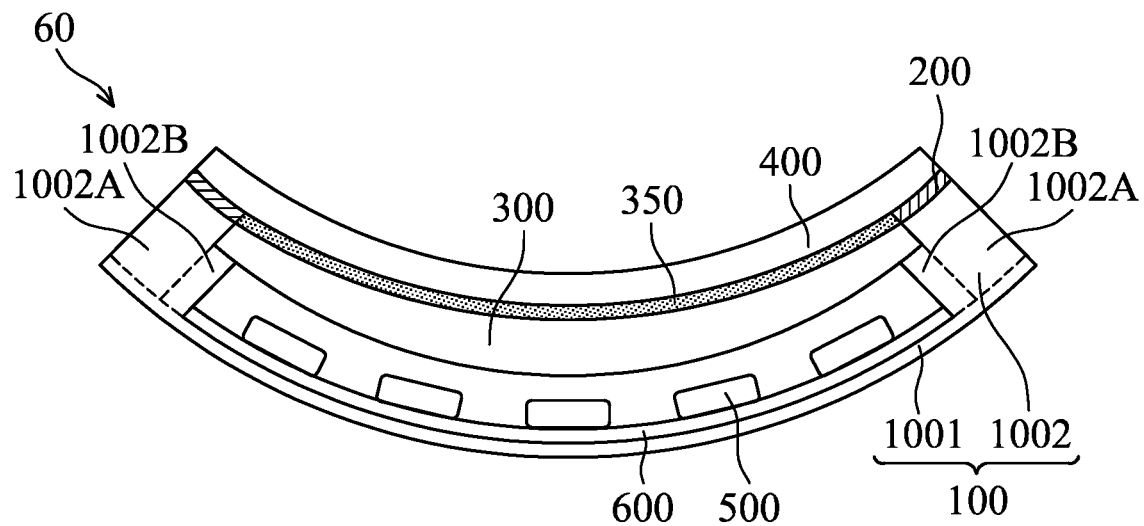

The electronic device 60 shown in FIG. 8 is similar to the electronic device 30 shown in FIG. 5. The difference between the electronic device 60 and the electronic device 50 is that from the direction of users' viewing, the electronic device 60 having the curved surface presents a concave surface, which means the middle of the device is recessed from the periphery of the device.

Figure 9:
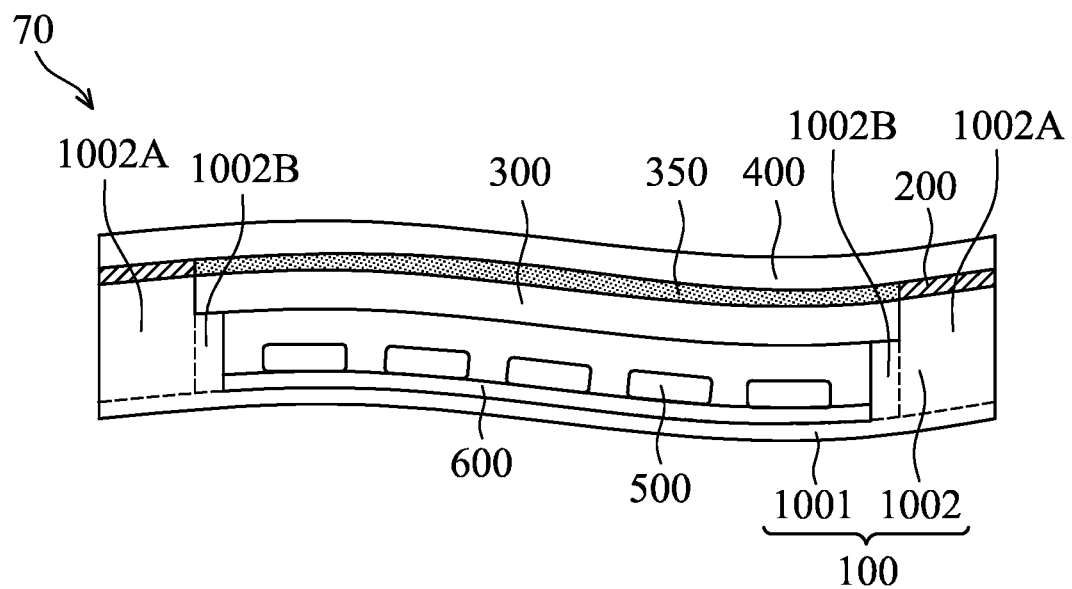
Figure 10:
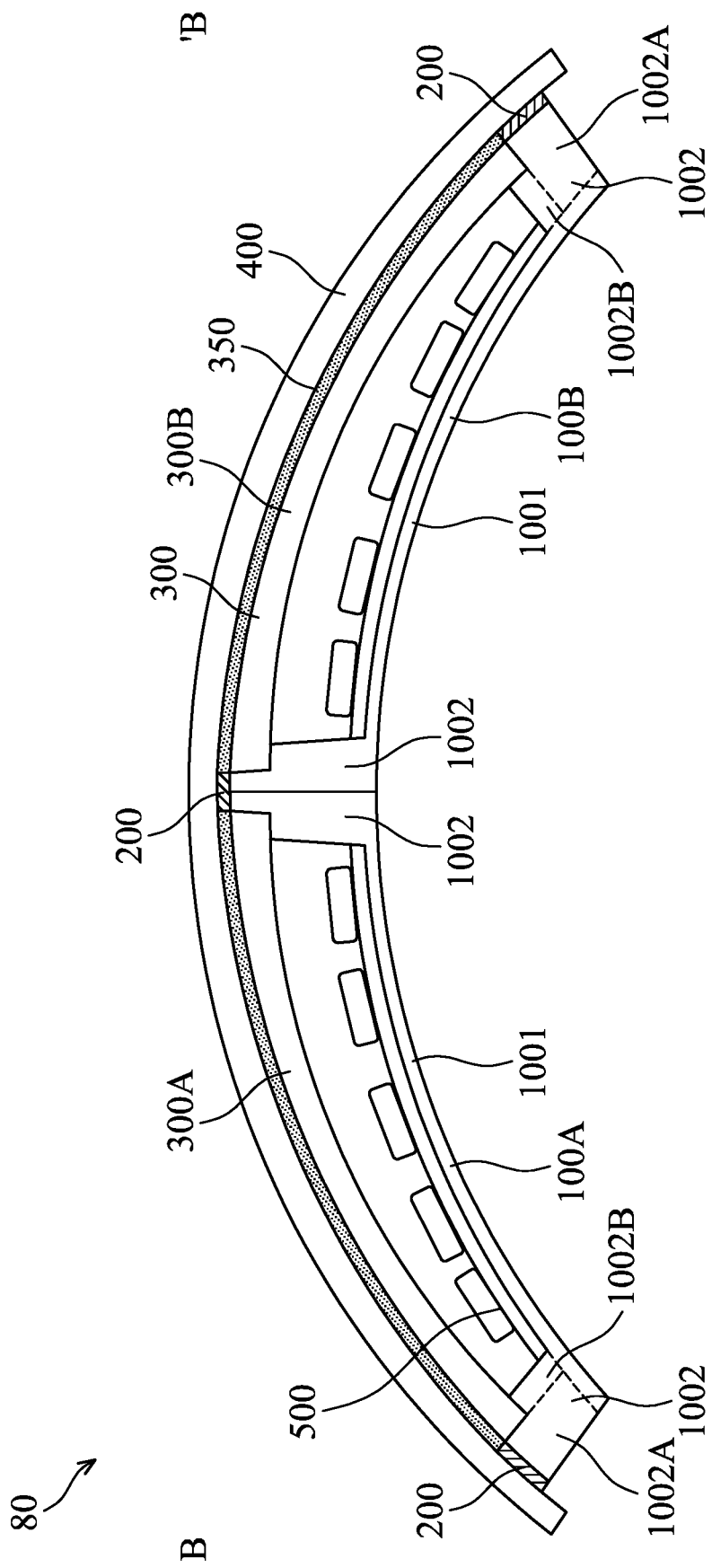
FIG. 10 is a cross-sectional view illustrating an electronic device having a curved surface in accordance with still some other embodiments of the present disclosure.
Figure 11:
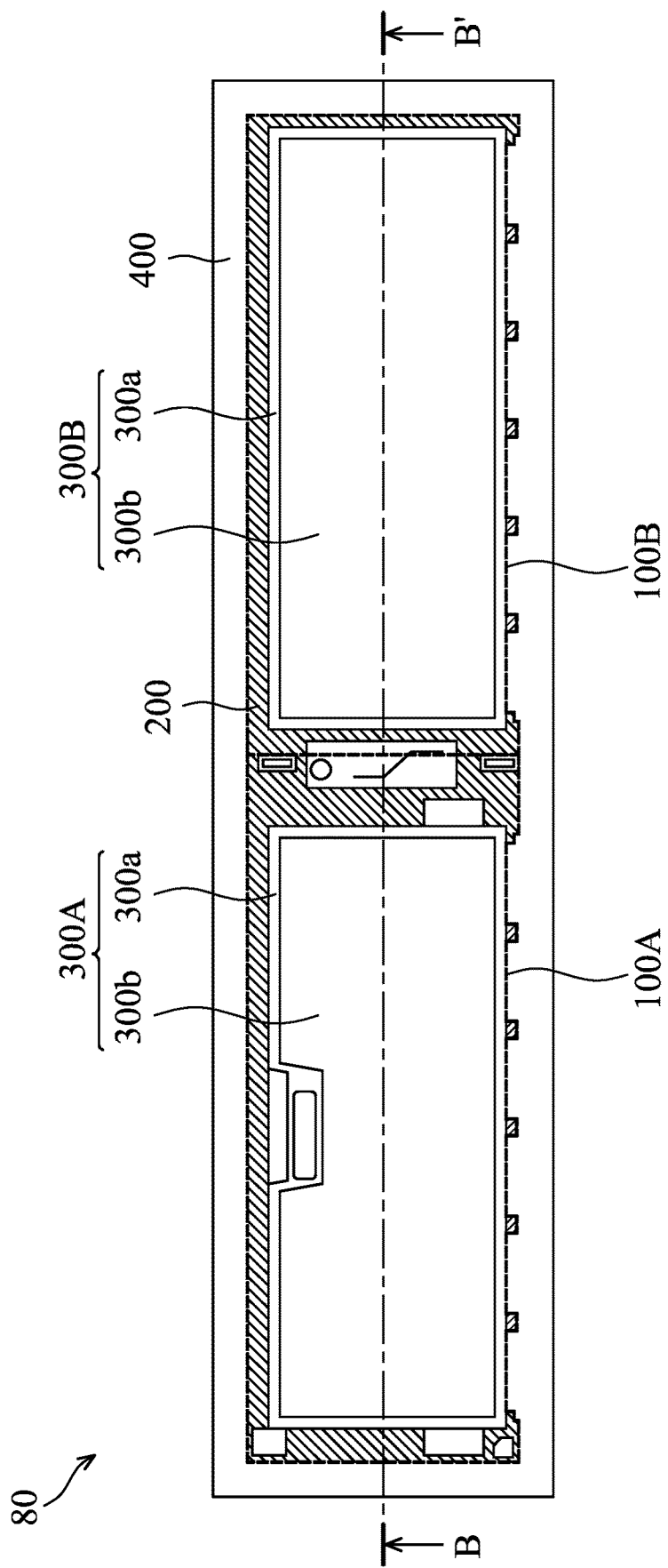
FIG. 11 is a top view illustrating the electronic device having the curved surface corresponding to FIG. 10 in accordance with still some other embodiments of the present disclosure.

The electronic device 70 shown in FIG. 9 is similar to the electronic device 30 shown in FIG. 5. The difference between the electronic device 70 and the electronic device 30 is that the electronic device 70 having the curved surface presents a wavy surface. Next, referring to FIG. 10 and FIG. 11, FIG. 10 is a cross-sectional view illustrating an electronic device 80 having a curved surface in accordance with still some other embodiments of the present disclosure and FIG. 11 is a top view illustrating the electronic device 80 having the curved surface corresponding to FIG. 10 in accordance with still some other embodiments of the present disclosure. Specifically, the cross-section line B-B' of FIG. 11 may correspond to the cross-sectional view of FIG. 10.

The electronic device 80 shown in FIG. 10 and FIG. 11 is similar to the electronic device 10 shown in FIG. 2 and FIG. 3. The difference between the electronic device 80 and the electronic device 10 is that the protective substrate 400 having the curved surface may, for example, correspond to a plurality of panels (such as two panels) having the curved surface (such as the panel 300A having the curved surface and the panel 300B having the curved surface) and/or a plurality of back frames (such as two back frames) each having the curved surface (such as the back frame 100A having the curved surface and the back frame 100B having the curved surface). In the embodiment of FIG. 2 and FIG. 3, the protective substrate 400 having the curved surface corresponds to the panels 300A and 300B having the curved surface. In some embodiments, the panel 300A having the curved surface and the panel 300B having the curved surface may be used to display the same or different display images. In some embodiments, the shape or the area of the display region 300b and/or the periphery region 300a of both of the panel 300A having the curved surface and the panel 300B having the curved surface may be the same or different depending on required design. In some embodiments, the shape or the area of the back frame 100A having the curved surface and the back frame 100B having the curved surface may be the same or different depending on required design. In some embodiments, the patterned adhesive element 200 may be disposed on a portion of the back frame 100A having the curved surface and/or a portion of the back frame 100B having the curved surface. In some embodiments, the back frame 100A having the curved surface and the back frame 100B having the curved surface may be formed integrally. In some embodiments, the back frame 100A having the curved surface and the back frame 100B having the curved surface may be adhered to each other by other adhesive elements.

In summary, according to some embodiments of the present disclosure, the electronic device having the curved surface may be formed by adhering the composite panel to the back frame having the curved surface through the patterned adhesive element. The patterned adhesive element disposed on a portion of the housing may reduce the probability of affecting the display effect, which is caused by the lights emitted by the backlight source being absorbed by the patterned adhesive element. In addition, according to some embodiments of the present disclosure, the cold bending process used to adhere (assemble) the composite panel and the back frame having the curved surface may reduce the defects likely to be caused by the substrate of the composite panel (such as water ripples or pitting or the like) during the thermal bending process.

While the embodiments and the advantages of the present disclosure have been described above, it should be understood that those skilled in the art may make various changes, substitutions, and alterations to the present disclosure without departing from the spirit and scope of the present disclosure. It should be noted that different embodiments may be arbitrarily combined as other embodiments as long as the combination conforms to the spirit of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. An electronic device, comprising:
   a backboard;
   a circuit board disposed on the backboard;
   a light source disposed on the circuit board;
   a housing disposed on the backboard, wherein the housing has a first portion and a second portion, wherein a thickness of the first portion is greater than a thickness of the second portion; and
   a panel disposed on the housing,
   wherein the panel contacts a top surface of the second portion of the housing, a side surface of the panel is adjacent to a sidewall of the first portion, and the light source and the circuit board are disposed between the panel and the backboard.

2. The electronic device as claimed in claim 1, the housing and the backboard comprise different materials.

3. The electronic device as claimed in claim 1, wherein the panel comprises a substrate, a polarizer, and a liquid crystal layer.

4. The electronic device as claimed in claim 1, wherein the housing has different thickness.

5. The electronic device as claimed in claim 1, wherein the housing has a stepped shape in a cross-sectional view.

6. The electronic device as claimed in claim 1, wherein the panel contacts the sidewall of the first portion.

7. The electronic device as claimed in claim 1, wherein the second portion is closer to the circuit board than the first portion.

8. The electronic device as claimed in claim 1, wherein the light source comprises a direct backlight.

9. The electronic device as claimed in claim 1, further comprising an optical element disposed between the light source and the panel.

* * * * *